DIRECTOR HUNTER AND SELECTOR

Filed April 8, 1955 4 Sheets-Sheet 1

INVENTORS
JOHN E. OSTLINE
WILLIAM J. PHILLIPS
BY
Wm Walter Owen
ATTY.

Aug. 25, 1959 J. E. OSTLINE ET AL 2,901,545

DIRECTOR HUNTER AND SELECTOR

Filed April 8, 1955 4 Sheets-Sheet 2

INVENTORS
JOHN E. OSTLINE
WILLIAM J. PHILLIPS
BY Wm. Walter Owen
ATTY.

Aug. 25, 1959 J. E. OSTLINE ET AL 2,901,545

DIRECTOR HUNTER AND SELECTOR

Filed April 8, 1955 4 Sheets-Sheet 3

INVENTORS
JOHN E. OSTLINE
WILLIAM J. PHILLIPS
BY *Wm. Walter Owen*
ATTY.

Aug. 25, 1959 J. E. OSTLINE ET AL 2,901,545

DIRECTOR HUNTER AND SELECTOR

Filed April 8, 1955 4 Sheets-Sheet 4

INVENTORS
JOHN E. OSTLINE
WILLIAM J. PHILLIPS

BY Wm. Walter Owen

ATTY.

United States Patent Office 2,901,545
Patented Aug. 25, 1959

2,901,545

DIRECTOR HUNTER AND SELECTOR

John E. Ostline, Chicago, and William J. Phillips, Northbrook, Ill., assignors to General Telephone Laboratories, Incorporated, a corporation of Delaware Application April 8, 1955, Serial No. 500,077
15 Claims. (Cl. 179—18)

The present invention is related in general to automatic telephone systems of the toll ticketing type which are adapted to produce a detailed record of each telephone toll connection completed. More particularly, this invention relates to improvements in the hunter and selector apparatus associated with the register sender or, as it is commonly known, the Director, as employed in such automatic telephone systems. An automatic toll ticketing system including a Director of the character with which the present invention is preferably related, as well as the present invention, is described in detail in the copending application of Ivan V. Coleman, Serial No. 487,500, filed February 11, 1955.

In a telephone system as described in the aforementioned copending application, connections are automatically completed from a calling subscriber station to a desired called subscriber station under the control of the register sender or Director which is provided in the originating exchange of the calling subscriber. In extending a connection, the calling subscriber merely operates his calling device in accordance with the directory number of the desired called subscriber station which directory number includes an office code portion comprising the first two letters of the called exchange name and a digit identifying the particular called exchange in the zone within which the called exchange is located. The first three digits thus transmitted by the said subscriber's calling device are registered in the register sender and are translated into one or more routing digits in order that the call will be properly routed to the called exchange desired. In the accomplishment of its routing function the register sender is instrumental in controlling a primary selector in the switch train originating with the calling subscriber substation. Accessible to the primary selector as controlled by the register sender or Director by way of its associated bank contacts are various trunk lines extending to other switch apparatus included in the exchange. Thus for example, there is available over such trunk lines apparatus which may be used in conjunction with calls that are to be completed on a national toll basis and apparatus used in conjunction with calls to be completed on a short-haul toll basis. Thus also by way of the aforementioned bank contacts are accessible trunks to the local exchange switch train and switch trains extending to exchanges not reached on a toll basis. To properly control the said primary selector it is clear that the register sender or Director is required to distinguish between the various call termini, particularly, for purposes of describing this invention, those exchanges within the national and short-haul toll systems and those exchanges not requiring the translation and toll apparatus. In the latter case the translating and routing function of the Director will not be called into service and the Director with its related apparatus may be released from association with the calling subscriber equipment. Thus the Director apparatus with which the present invention is related, is adapted to be released responsive to a particular combination of two predetermined first digits followed by any one of a group of predetermined third digits which may be dialed by the calling subscriber. That is, the third digit dialed after the said particular combination of two predetermined first digits have been dialed will be the critical digit determining whether or not the Director apparatus will continue in service and complete its operations or will be released. In the latter case all the subsequent digits dialed by the calling subscriber will directly control the succeeding switch train. Thus in the Director described in the aforementioned copending application, if the first and second digits dialed are 2 and 7, respectively, and the third digit of the code dialed is 0, 1 or 3 to 9, inclusive, the Director apparatus will be caused to be released from the primary selector and its associated switch trains. The apparatus associated with the register sender or Director together with the specific manner of accomplishing the various functions appertaining thereto is fully described in the said copending application of Coleman.

In the exchange apparatus with which the use of the present invention is contemplated there is provided a group of register senders or Directors which are accessible to various primary selectors by means of Director hunters individual to each primary selector. As a Director is released responsive to the dialing of the said particular combination of two first digits and a said critical third digit or at the time when all the items of information pertaining to a toll connection have been recorded and the connection has been completely established that Director becomes immediately available to other primary selectors and that Director may be found by another Director hunter. In addition, means are provided for releasing the Director and its associated apparatus should the calling subscriber abandon the call or in the case of a malfunctioning Director such as when there has been a failure of identifying the calling subscriber. In the latter event provision must be made to insure that the calling subscriber, in re-attempting to complete the call, is not immediately again presented with the malfunctioning Director with which he was previously connected. This provision is made in the present invention by means of circuit arrangements which cause any particular Director hunter connecting a primary selector and a Director to be stepepd ahead one position at the time that the Director is released for any reason. Thus in the case of a malfunctioning Director when the calling subscriber reattempts a call the Director hunter will seize the Director associated with the new position of the Director hunter or, if the next Director is busy, the next idle Director. Similarly, when the Director is released on a local call responsive to the dialing of the said predetermined digits or at the completion of the recording of the pertinent items of information of a national or short-haul toll call the Director hunter will be stepped ahead one position as a result of which the next idle Director will become available to that Director hunter. A more uniform distribution of the employment of the Director apparatus will also thus be achieved.

It is the primary object therefore of the present invention to provide improved circuits and apparatus for operating the Director hunter to step ahead one position in response to the release of the register sender or Director apparatus upon those occasions when its services are no longer required. These occasions as outlined hereinbefore include the completed recordation of desired items of information pertaining to national and short-haul toll connections, the determination that the call is a local or non-toll call, the malfunctioning of the Director equipment, and the abandonment of the call by the calling subscriber.

It is another object of this invention to provide in the said improved circuits and apparatus of the preceding paragraph an arrangement whereby the Director hunter is stepped ahead to a new position when the Director apparatus is released responsive to the dialing by the calling subscriber of a particular combination of two predetermined first digits and a critical third digit which digits are determinative of calls other than those requiring translation apparatus.

A further object of this invention is the provision of improved circuit and apparatus of the foregoing objects to insure that any Director hunter after releasing from a Director will be caused to test the condition, whether busy or idle, of all the succeeding Directors accessible to it before the Director just released is again seized by the same Director hunter.

Still another object of this invention is to provide, in each register sender or Director apparatus, a single Director release arrangement, said release arrangement operated by control circuits each of which is energized responsive to a particular operating condition of the Director apparatus to cause the Director hunter to step ahead to a new position.

Further objects and features of the present invention pertain to the particular arrangement of the circuit elements of the apparatus employed in controlling the Director hunter and selector whereby the above objects are achieved. This invention, both as to its organization and manner of operation, together with its objects and advantages, will be best understood by reference to the following detailed description taken in connection with the accompanying drawings.

To simplify the description of the present invention and to avoid unnecessary repetition of the details of associated system components, reference will be made herein to the said copending application of Coleman, Serial No. 487,500, filed February 11, 1955. Since the present invention is completely disclosed in the system described in that application only so much of that system will be shown in detail as is considered necessary to describe the present invention. Other and related circuit components will be symbolized by means of block diagrams. In the interests of clarity all circuit elements and components herein will be designated by the same reference characters used to designate the same circuit elements and components shown in the said copending application.

The accompanying drawings, the Figures 1 through 4 of which may be arranged as indicated by the connecting conductors, show sufficient circuit details of a complete automatic toll ticketing telephone system from which the present invention may be understood. Of the drawings:

Fig. 1 is a block diagram and partial schematic representation of a single calling subscriber substation, a line circuit and distributor, a line finder, the primary selector, and the associated Director hunter. In this figure is shown a simplified presentation of the calling subscriber loop for controlling the line relay R450 and the various relays of the controller shown in Fig. 2 with their operating circuits which are controlled in effecting the Director release.

Figure 1:
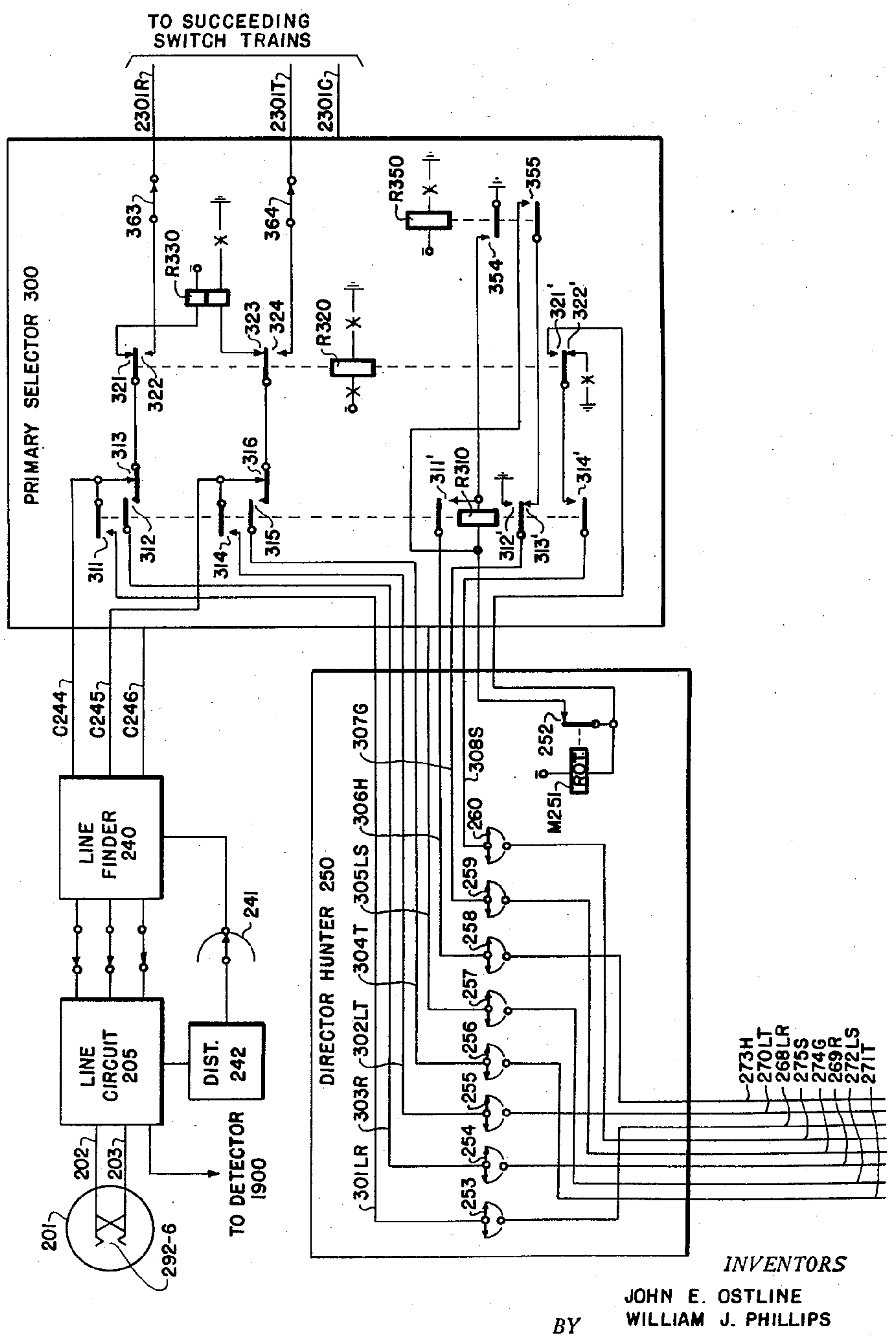

Referring now particularly to Figs. 1 through 4 of the accompanying drawings and generally to the aforementioned copending application of Coleman, the present invention will be described in detail. In accordance with the scope of the present invention the organization and operation of the Director equipment and its hunter and selector will be described only to the extent that they have direct or indirect bearing thereon.

It will be assumed that a calling subscriber, at the time when the handset was removed from its cradle, completed the usual loop circuit including the line conductors 202 and 203 and the impulsing springs 292–6 for operating the line circuit 205. The line circuit 205 in response to the completion of the loop circuit initiates operations whereby the distributor 242 will select an idle line finder such as 240 by means of a rotary switch 241. It will be further assumed that the rotary switch 241 selects the particular line finder 240 which in turn operates in a well-known manner to find the calling line.

When the rotary switch 241 selects the line finder 240 a circuit is completed for the start relay, not shown, of the line finder 240. Upon operating, the start relay, at one of its contacts, also not shown, applies battery potential to the conductor C245 through contacts 316, the lower winding of the line relay R330 and contacts, not shown, of a rotary step cam to ground. As soon as the line relay R330 operates it initiates a series of operations, particularly described in the aforesaid copending application, resulting in the operation of the transfer relay R350. This latter relay, upon operating completes a circuit at its contacts 354 including the winding of the test relay R310, contacts 252 and the winding of the magnet M251 to battery. However, due to the circuit including the contacts 355, 313′, the conductor 307G and the wiper 259 of the Director hunter 250, the Director test relay R310 is shunted as long as the wiper 259 encounters a grounded bank contact indicating a busy Director.

The ground potential indicating a busy Director encountered by the wiper 259 will complete a circuit for the motor magnet M251 by way of conductor 307G, contacts 313′ and 355, and interrupter contacts 252 of magnet M251 so that the magnet M251 can advance the wipers 253 to 260, inclusive, step-by-step to search for an idle Director. An idle Director such as the Director shown in part in Figs. 2, 3 and 4, will be indicated by an absence of ground on the contact of the switch bank corresponding to the conductor 274G and, therefore, the stepping circuit for the motor magnet M251 will be interrupted. When this occurs, the short circuit for the Director test relay R310 is removed so that the previously traced circuit, including the contact 354, the relay R310 and the magnet M251 is effective to operate relay R310. The relay R310 operates in series with the magnet M251 but due to the resistance of the relay R310 the magnet M251 does not operate at this time.

As a result of the operation of the Director test relay R310, at its contacts 312′ and 313′ it now applies ground potential to the conductor 307G in order to mark the seized Director busy to all other Director hunters such as the Director hunter 250, having access thereto and interrupts the previously described shunting circuit for the relay R310, respectively. Also at its contacts 314′ the relay R310 prepares a point in the circuit for connecting the conductor 308S to the motor magnet M251. Furthermore, at its contacts 311 and 314, and 313 and 316′ the relay R310 transfers the conductors C244 and C245 from the circuit including the windings of the line relay R330 to a circuit including the conductors 301LR and 302LT extending by way of the Director hunter 250 to the controller 400 of Fig. 2. Simultaneously therewith, the relay R310, at its contacts 312 and 315, connects the circuit including the windings of the relay R330 to the conductors 303R and 304T of the Director hunter 250 to the call register 900 of Fig. 3 and to the call recorder 2000 of Fig. 4.

Figure 2:
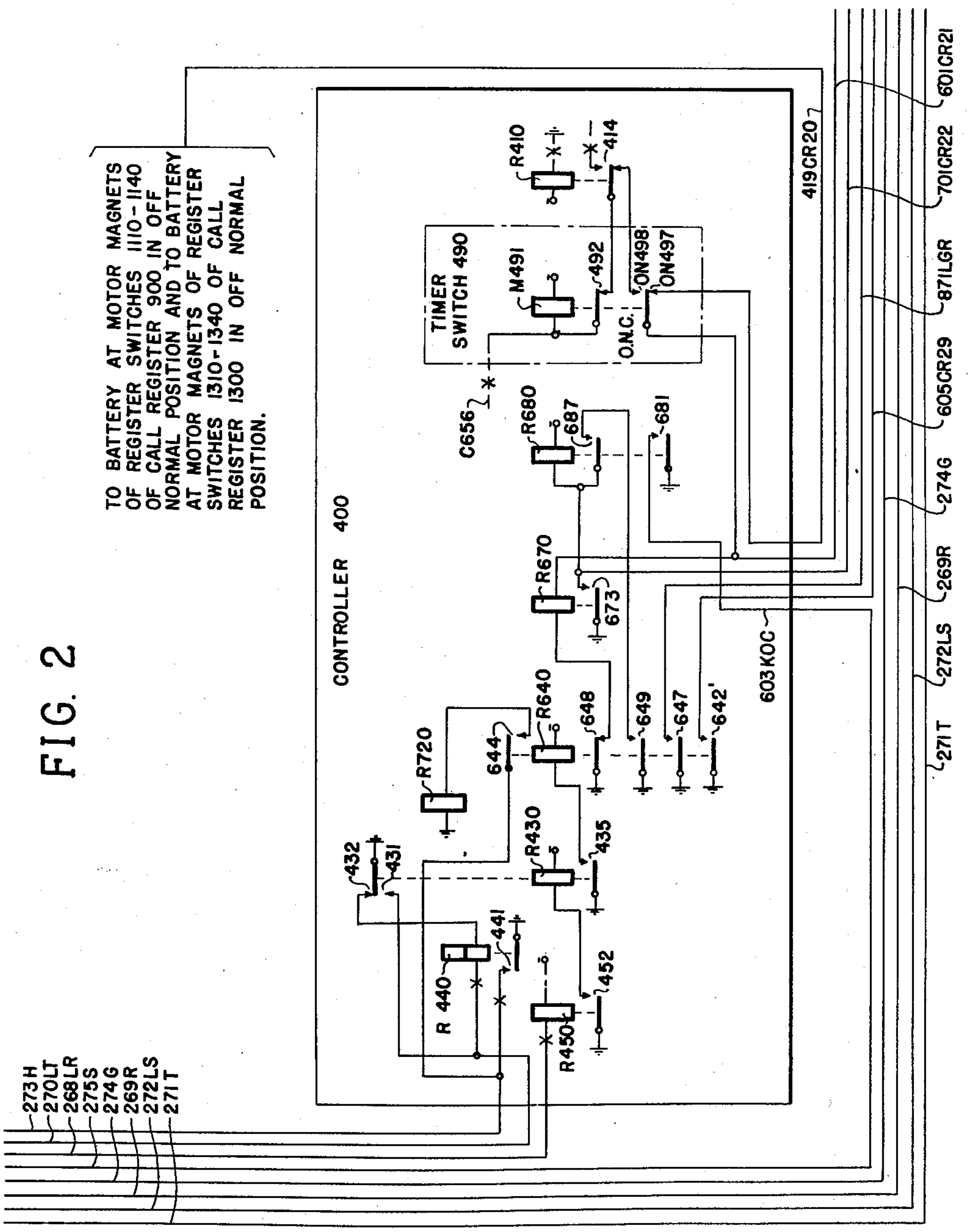
Fig. 2 shows schematically certain pertinent circuits of the controller portion of the Director equipment including control circuits and relays for realizing the objects of this invention. Here also are shown only those circuits which contribute directly to the release control of the Director equipment.

More specifically, the loop circuit from the calling subscriber line now extends over a first branch including the conductor C244, contacts 311, conductor 301LR, wiper 253, conductor 268LR, extending to Fig. 2 where the first branch may be traced through the upper winding of the line relay R450 to negative battery. The other branch of the loop circuit from the calling subscriber line includes the conductor C245, contacts 314, conductor 302LT, wiper 255, conductor 270LT extending to Fig. 2 where the second branch may be traced through the lower winding of the line test relay R440 to ground.

During the time that the Director hunter 250 is searching for an idle Director, the line finder 240 is also searching for the calling subscriber line. If the Director hunter 250 finds an idle Director before the line finder 240 finds the calling line, then the battery potential applied by the aforesaid start relay to the conductor C245 is extended by way of the contacts 314, conductor 302LT, wiper 255, conductor 270LT extending to Fig. 2, through the lower winding of the test relay R440 to ground. Line test relay R440 will in this case operate and apply a ground potential at its contacts 441 to the conductor 273H extending to Fig. 1, wiper 258, conductor 306H, contacts 311′ closed upon the operation of Director test relay R310, the winding of the latter relay, contacts 252 and the winding of the motor magnet M251 to battery. This circuit will hold the Director test relay R310 locked in its operated position under the control of the Director during the time that the line finder 240 coninues to search for the calling subscriber line.

As soon as the line finder 240 finds the calling subscriber line, it switches through in the conventional manner and connects the calling subscriber loop circuit to the conductors C244 and C245. In addition, the line finder 240 also dismisses the distributor 242, making the latter available for distributing line finders for use by other calling subscriber lines. Furthermore, the switch through operation of the line finder 240 causes the restoration of the referred to start relay in order to remove the battery potential from the conductor C245. This operation would normally cause the restoration of the line test relay R440, but, due to the fact that the line finder has switched through the calling subscriber loop circuit to the conductors C244 and C245, the above traced loop circuit is now completed for the upper winding of the line relay R450 in series with the circuit for the lower winding of the line test relay R440. The line relay R450 now operates and completes at its contacts 452 an obvious circuit for operating the hold relay R430, which latter relay, at its contacts 432 and 431 respectively, disconnects the lower winding of the line test relay R440 from the previously traced loop circuit including the upper winding of the line relay R450 and connects ground potential directly to the loop circuit. The line test relay R440 now restores to normal and at its contacts 441 will interrupt a point in the previously traced circuit for locking the Director test relay R310 in its operated position. However, as soon as the seizure relay R640 operates a holding ground potential will be maintained on the conductor 273H through the hold relay R720 and contacts 644 of relay R640. Relay R640 is operated as a further result of the operation of the hold relay F430 which, at its contacts 435 completes an obvious circuit for the relay R640. Thus the Director test relay R310 is retained in its locked position and the hold relay R720 operates in series with it.

As soon as the Director test relay R310 operates and connects the line relay R330 to the conductors 303R and 304T, the line relay R330 restores to normal. As a result the transfer relay R350 also restores to normal as described in the copending application and the alternate ground potential for the relay R310 is interrupted at the restored contacts 354. The primary selector 300 is now fully restored to normal except for the operated Director test relay R310.

Referring again to the controller portion 400 of the Director, the seizure relay R640 operated as described above in response to the completion of the circuit therefor by the operation of the hold relay R430. As soon as the relay R640 operates, contacts, in addition to the contacts 644 previously mentioned, controlled by the relay R640 are operated to provide various relay holding and locking ground potentials several of which only need be considered in describing the present invention. At its contacts 642′ the relay R640 applies a ground potential to the conductor 605CR29 extending to the call recorder 2000 of Fig. 4 and the call sender 1400 of Fig. 3 to prepare a circuit to operate the relay R1660 by way of the contacts 2164 of the relay R2160 of the call recorder 2000. Simultaneously at its contacts 647 the relay R640 applies a ground potential to the conductor 871LGR extending to the call register 900 of Fig. 3. The operation of additional contacts of relay R640 will be considered in connection with the description of the relay operating circuits controlled by the contacts.

A series of operations are now performed by the controller 400 portion of the Director equipment incident to preparing the Director to receive dialed digital impulses from the calling subscriber line. When these are received the control exercised by the Director over the primary selector 300 will depend upon the office code digits dialed by the calling subscriber. Certain of the called office code digits used only in completing local calls within the exchange of the calling subscriber will require no translation, and by means of suitable strapping, not shown, the primary selector 300 can be controlled to operate during the dialing of the second or third digit, the Director being released from the Director hunter 250 in a manner to be described after the primary selector 300 has been stepped to the level corresponding to the controlling digit. Also when the called office code digits are shared with other exchanges no translation to complete a connection will be necessary. Here the primary selector 300 is controlled during the dialing of the second or third digit but the Director will be released only after the dialing of the third digit. In this case the primary selector 300 may be stepped during the dialing of the second digit with the result that it will seize a subsequent switch train whereupon a switch in the latter train will be controlled during the dialing of the third digit. The operation of the Director with respect to its control of the primary selector 300 during the dialing of the second and third digits are discussed in detail in the copending application previously mentioned and will not here be described. However, it will be assumed for purposes of description that the Director if released, will be released only upon the dialing by the calling subscriber of the third digit.

When the primary selector 300 has been operated under the control of the second or third dialed digit to raise its wipers to the level corresponding to the digit dialed it will automatically search for an idle trunk in a well-known manner. When such an idle trunk is found the switch through relay R320 will operate over a circuit not shown and not here relevant to the description of the present invention. The relay R320, at its contacts 321 and 323 disconnects the line relay R330 and, at its contacts 322 and 324, connects the control circuit including the conductors 303R and 304T from the Director by way of the wipers 363 and 364 to the next switch in the switch train that is selectable over a trunk in the said level of the selector 300. Also at its contacts 321′, the relay R320 prepares a point in the circuit for connecting the conductor 308S to the motor magnet M251. After the switch through operation of the relay R320 the only relays in the primary selector 300 that now remain in their operated positions are the switch through relay R320 and the Director test relay R310. The switches of the succeeding switch train may now be operated responsive to additional digits dialed by the calling subscriber if the Director has been released responsive to the third dialed digit in the manner to be described.

Release of the Director and the stepping ahead of the Director hunter 250 responsive to the dialing by the calling subscriber of a particular combination of predetermined first two digits followed by the dialing of a predetermined third digit will now be described in detail.

When the first predetermined digit is dialed by the calling subscriber the line relay R450 in the controller 400 portion of the Director follows the impulses of the digits through the subscriber loop circuit in the well-known manner to register this digit in the call register 900. At one of its contacts not shown in the drawings this line relay will momentarily complete a circuit for operating the motor magnet M1021 of the first digit register 1020 of the call register 900. Each operation of this contact referred to will cause a corresponding operation of the motor magnet M1021 of the register switch 1020 to thereby advance its wipers, including the wiper 1026, step-by-step to a position corresponding to the number of impulses representing the first dialed digit. In this manner the first dialed digit is registered in the first digit register 1020 of the call register 900. After registration of each dialed digit the receive sequence switch 1010 is advanced one step. The series of impulses representing the second digit dialed will operate the controller 400 line relay R450 in the same manner as the first series. However, as the result of the directive operation of the receive sequence switch 1010 the circuit completed by the line relay will now include the motor magnet M1031, of the register switch 1030. The wipers of this switch 1030, including the wiper 1036, will also be advanced step-by-step to a position corresponding to the number of impulses representing the second dialed digit which is thus registered in the second digit register 1030.

The third digit of the called subscriber number dialed by the calling subscriber will control the controller 400 line relay R450 in the same manner as described in connection with the first two digits dialed. However, the series of impulses representing the third digit will operate the motor magnet M1041 of the third digit register switch 1040 to thereby register the third digit dialed. In this manner the wiper 1046 has been advanced to a position corresponding to the number of impulses represented by the third dialed digit.

Included in the call register 900 is a plurality of control relays and a terminal block which are utilized in conjunction with the digit registers noted and which are used to exercise various controls over the primary selector 300 depending upon the values of the different digits registered in the register switches 1020, 1030 and 1040. By means of suitable strappings on the terminal block TB909 and responsive to certain of the called office code numbers in the manner to be described, the primary selector can be variously controlled to operate during the dialing of the second digit and/or during the dialing of the third digit as may be necessary to establish the required connection. Since the release of the Director will be accomplished upon the dialing of the critical third digit in the same manner in any of these modes of selector 300 operation they will not therefore be here individually considered. In order to describe, particularly in respect to the release thereof, the operation of the Director during the dialing of the first and second predetermined digits and its subsequent action depending upon the value of the third digit dialed, it will be assumed that the called office code digits dialed by the calling subscriber are included in the code block "27."

Figure 3:
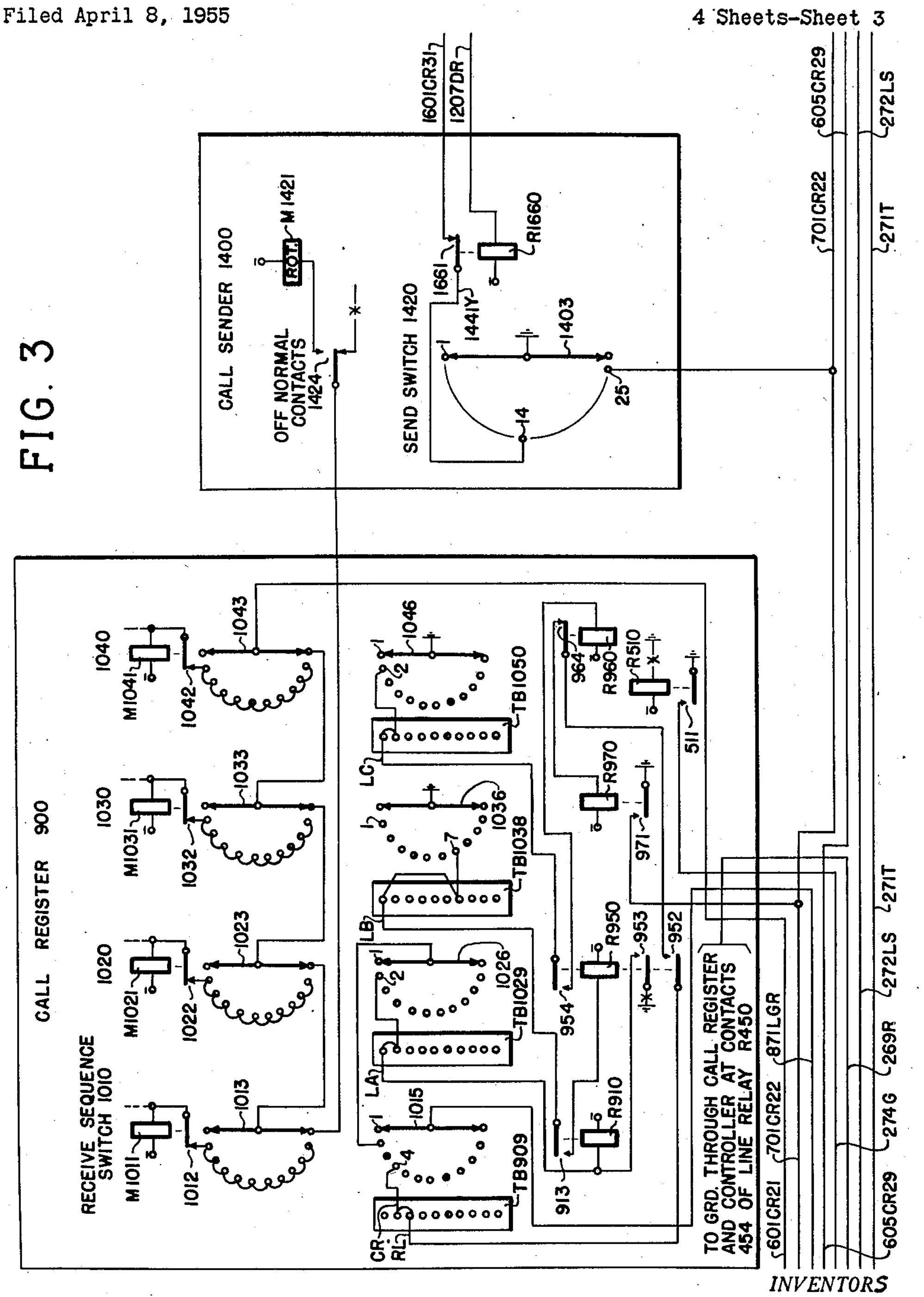
Fig. 3 shows schematically those circuits of the call register portion of the Director which effect its release upon the dialing by the subscriber of the local code. Here also is shown certain connections to the send switch of the call sender portion of the Director.

Referring to Fig. 3, it is evident that if the first digit "2" of the code block "27" is registered in the first digit register 1020, the wiper 1026 will be in engagement with the contact 2 and since the terminal 2 on the terminal block TB1029 is strapped to the LA terminal on the block, a circuit is prepared for operating the first digit relay R910. To complete the operating circuit for this relay the receive sequence switch 1010 during the dialing of the first digit 2 has its wipers in engagement with the contacts 1 and during the inter-digital pause between the dialing of the first and second digits the switch 1010 advances its wipers into engagement with the contact 2. When this occurs, ground potential applied to the wiper 1015 over the conductor 871LGR (from ground through the contact 647 of the relay R640 which it will be recalled is operated as soon as the line finder 240 switches through to connect with the calling subscriber) is now connected by way of the engaged contact 2, wiper 1026 of the first digit register 1020, engaged contact 2 in the associated contact bank and then over the above traced circuit to operate relay R910. As relay R910 is operated it prepares at the contacts 913 a point in a circuit for operating the relay R950 in the event the second digit "7" is dialed.

The second digit dialed by the calling subscriber will cause a second series of impulses to be repeated over the previously traced circuit to the second digit register 1030. In response to the registration of the second digit, here "7," in the second digit register 1030, the wipers, including the grounded wiper 1036, will be in engagement with the contacts 7 in the associated contact banks. The grounded wiper 1036 in engagement with the contact 7 will complete a circuit including the terminal LB of the terminal block TB1038, the winding of the relay R950 and the battery through the contacts 913 in order to operate the relay R950. At its contacts 952 the relay R950 prepares a point in a circuit traced hereinafter for controlling the Director release relay R959, at its contacts 954, the relay R950 prepares a point in the circuit traced hereinafter for controlling the relay R960, and, at its contacts 953, closes a locking circuit for the relay R910, the operation of which was previously described. It should be noted in connection with the last mentioned locking circuit that the wiper 1015 of the receive sequence switch 1010 is not advanced from its contact 2 until the end of the interdigital pause between the dialing of the second and the third digits, that is, not until after the relay R950 has operated.

If the third digit of the office code is 0, 1 or 3 to 9, inclusive, the Director will be released so that all of the subsequent digits dialed by the calling subscriber will directly control the switch train. It will be assumed that a local office code, for example, "276" is dialed by the calling subscriber, the digit "6" of which is registered in the third digit register 1040. At the end of the dialing of the third digit the receive sequence switch 1010 will advance its wipers from engagement with the third contacts in the associated contact banks and into engagement with the fourth set of contacts. When this occurs the ground potential applied to the conductor 871LGR by the operation of the relay R640 as previously described is connected by way of the CR conductor, terminals on the terminal block TB909 and the strapping thereon, to the RL conductor, contacts 952 and 964 and the winding of the Director release relay R970 to battery. The relay R970 at its contacts 971 applies ground potential to the conductor 701CR22 extending to the controller 400 in order to operate the Director release relay R680 over an obvious circuit.

It should be noted that the operation of the Director release relay R970 responsive to the third digit of only one code block has been described. By means of special strapping and additional control relays corresponding to the relays R910 and R950, the operation of which has been described, other code blocks may be used. In any case, however, the dialing of a critical third digit representing a call not requiring translation will cause the operation of the Director release relay R790 as described for the code block "27." These possibilities are fully described in the copending application of Coleman aforementioned.

When the Director release relay R680 in the controller 400 operates it completes a locking circuit for itself through its contacts 687 to ground at the make contacts 649 of the seizure relay R640. This latter relay, it will be recalled, is operated as soon as the line finder 240 switches through to connect with the calling subscriber. At its contacts 681 the relay R680 connects ground to the conductor 603KOC which extends to the conductor 275S in turn extending to the Director hunter 250. The latter conductor terminates in the bank contacts of the director hunter 250 and the ground potential thereon will be extended by way of the wiper 260, conductor 308S, contacts 314′ and 321′ to directly energize the winding of the motor magnet M251. The stepping magnet of the Director hunter 250 is thus energized but the hunter 250 is a switch of the type that advances its wipers when the stepping magnet releases its armature rather than when the magnet is energized. As soon as the magnet M251 operates, it interrupts, at its contacts 252 its own energizing circuit whereupon the magnet M251 restores and automatically advances its wipers, including the wiper 260, one step. This will cause the wipers 253 through 260 to disconnect from the particular Director that has been employed to establish the connection.

Operation of the motor magnet M251, at its contacts 252, interrupts the locking circuit for the Director test relay R310 in the primary selector 300. This latter relay now restores to normal and, at its contacts 313 and 316, performs a switch-over operation whereby the calling subscriber line is disconnected from the Director and connected directly to the established connection set up under control of the Director through the primary selector 300 and subsequent switches in the switch train. Also upon restoring the relay R310, at its make contacts 314′ interrupts the direct energizing circuit for the magnet M251 completed by the operation of relay R680.

Although the Director release relay R680 has completed its primary function of connecting ground at its contacts 681 for the motor magnet M251 of the Director hunter 250, additional functions not important to a description of the present invention require that the relay R680 be released only at the time that circuits controlling its operation permit. Thus the relay R680 is not released until various components of the Director equipment are fully restored to normal. When this restoration is complete the relay R680 at its contacts 681 disconnects the ground from conductors 603KOC and 275S extending to the Director hunter 250 and, at additional contacts not shown, the relay R680 is also instrumental in removing busy marking ground for the instant Director from its appearances on the bank contacts of the Director hunters, such as the hunter 250, having access thereto.

Returning now to the dialing of the third digit by the calling subscriber, if this third digit after the above illustrated code block should be the digit "2" rather than any one of the digits 0, 1 or 3 to 9, the impulses represented by the digit "2" will be registered in the third digit register 1040. When the grounded wiper 1046 of the third digit register 1040 engages contact 2 in the associated contact bank it completes a circuit including the terminal LC on the terminal block TB1050 and the contacts 954 for operating control relay R960. The relay R960, at its contacts 964, interrupts a point in the circuit for the relay R970 to thereby prevent at this time the operation of the relay R970 and the operation of Director release relay R680 as described above. As a result the Director hunter 250 will not be caused to step ahead and the Director will not be released. In addition, other three digit office code numbers assigned to exchanges other than those described above or three digit national toll code numbers followed by three digit office code numbers identifying a called exchange within one of the national toll code zones may be registered in the Director. In either of the latter cases the translation and routing function of the Director will be required and the Director hunter 250 will not step ahead and the Director will not be released. In these cases the control relays R910 and R950 and the Director release relay R970 will not operate as previously described and no ground will be provided at this time for the Director release relay R680 of the controller 400 portion of the Director.

The calls requiring the translation and routing function of the Director equipment, that is, calls within the national toll dialing system and short-haul toll calls, generally also require recording equipment associated with the Director in order that the proper charges pertaining to a call may be assessed. The translator equipment 2700, shown only in part, will register whatever route digits are necessary to route the call to the exchange of the called line. Provision, however, has also been made for certain other calls which although requiring the translation and routing operation of the Director will not require the associated recording equipment since no charge is to be made for such calls. The latter calls are initiated by the dialing of the calling subscriber of certain predetermined three digit special service code numbers which are registered respectively in the first three digit registers 1020, 1030, and 1040. In this case the translator 2700 will again register whatever route digits are necessary to route the call to a special service telephone. The translator 2700 will also determine from the digits of the special service code dialed that no recording with its subsequent ticketing of the call is to be made.

In the two translating and routing operations of the Director, that is, translating and routing including recording and unticketed translating and routing, the release of the Director and the advancing of the Director hunter 250 is effected in different ways. Release of the Director following the first mentioned operation of the Director will now be described.

Figure 4:
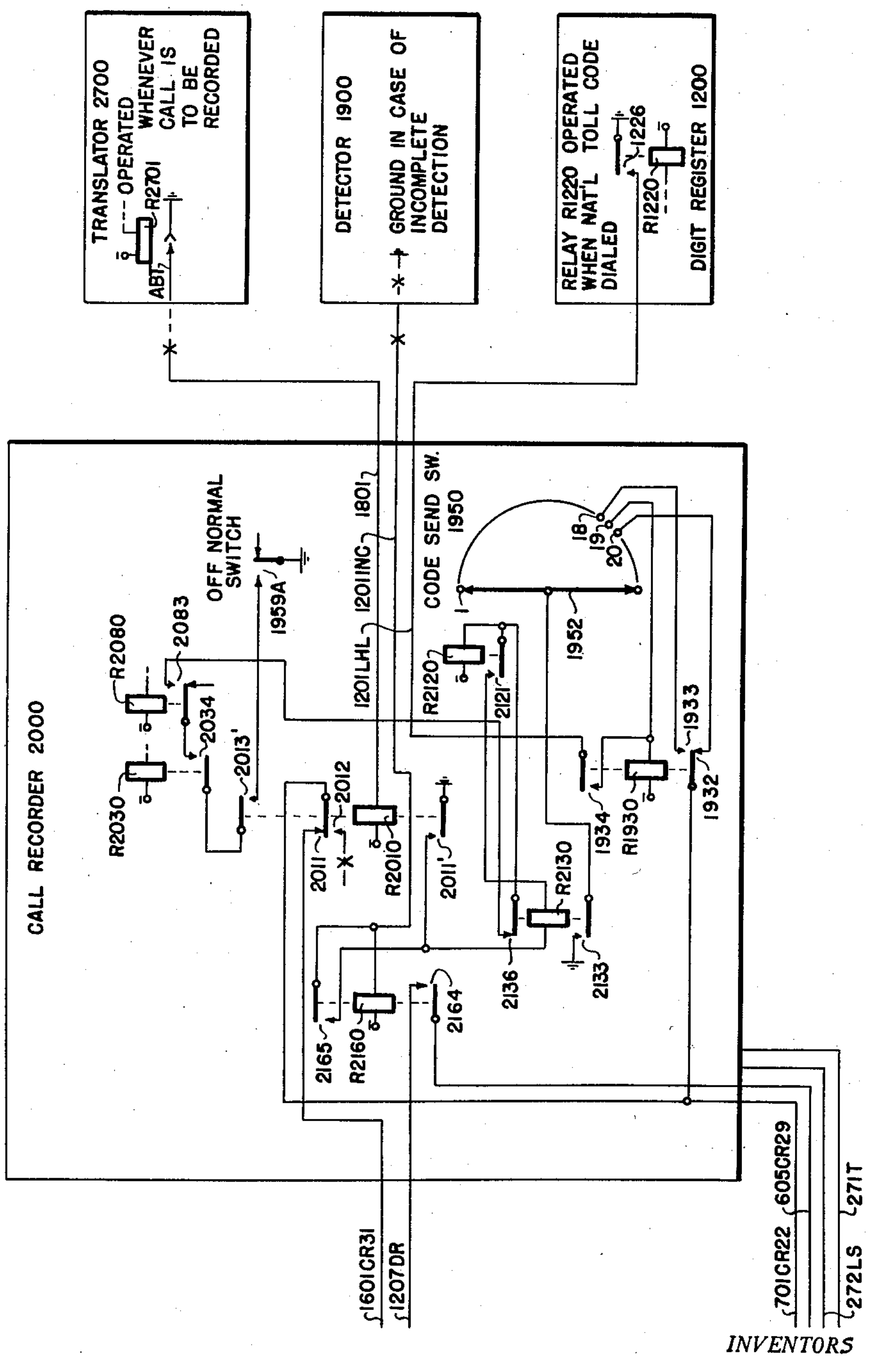
Fig. 4 shows schematically and in block diagram form the call recorder, translator, detectors and digit register portions of the director.

Whenever it has been determined in the translator equipment 2700, shown in part in Fig. 4, that the call recorder 2000 will be required in conjunction with making a permanent record of the items of information pertaining to a call, ground will be supplied by means of operating circuits and through intermediate equipment, neither of which is shown herein, to a conductor 1801 extending to the relay R2010 and negative battery for operating relay R2010. Relay R2010 upon operating prepares a point in a circuit at its grounded contacts 2011′ for the wiper switching relay R2130 and at its contacts 2013′ prepares a point in a circuit for the relay R2120. The operation of the call recorder 2000 which follows results in the transmission of data pertaining to the call in progress which is stored therein in code form to succeeding toll ticketing equipment, not shown, which operation is described in detail in the said copending application of Coleman. Central to the said transmission of data is the code send stepping switch 1950 which, by means of its wipers 1951 to 1955, inclusive, only the wiper 1952 of which is shown, selects the particular information to be transmitted to toll ticketing apparatus to be stored therein and effects various controls over the operating circuits of the recorder 2000. Thus, during its first stepping cycle of rotation, a wiper 1953, not shown, is effective to transmit in code form to the toll ticketing apparatus the identity of the calling Director and the three digits of the called office code or, if the call is to be placed within the national toll system, the first three digits of the national toll code. During the second stepping cycle of rotation of the switch 1950, a wiper 1954, also not shown, is effective to transmit in code form to the succeeding toll ticketing equipment the four digits of the numerical portion of the directory number of the calling station and the third digit of the calling office code. During the third stepping cycle of rotation of the switch 1950, a wiper 1955, also not shown, will be effective to transmit in code form to the toll ticketing equipment the informational data pertaining to the called station. If the call is one within the national toll system then during a fourth rotational stepping cycle of the switch 1950 the wiper is utilized to transmit the additional informational data required to assess the call.

During the first stepping cycle of the switch 1950 and as the wipers have been advanced from the normal or home contact position the off-normal contacts 1959A will be closed. These contacts will remain in a closed position until the said wipers are again rotated into engagement with the home contact position in the associated contact banks at which time the contacts 1959A will be opened. When the contacts 1959A are closed a circuit, not shown, is completed to operate the relay R2030 which locks itself through contacts and a circuit also not shown. At its contacts 2034, the relay R2030 prepares a further point in a previously mentioned circuit for the relay R2120. The relay R2080 shown as controlling, at its contacts 2083, a still further point in the latter circuit, is prevented from operating by a shunting circuit not shown. It is sufficient to state here that the said shunting circuit is operated as long as the initial operating circuit for the relay R2030 is completed at the contacts 1959A.

At the end of the first stepping cycle of the switch 1950 the wipers of this switch will again be in position on the home contacts of the associated contact bank and the off-normal contacts 1959A will again be open. When this occurs the above mentioned initial operating circuit for the relay R2030 will be opened and as above stated the relay R2080 will be permitted to operate. The relay R2030 will, however, continue in its operated position because of its locking circuit. Operation of the relay R2080 prepares, at its contacts 2083, the said further point in the previously mentioned circuit for the relay R2120.

During the second stepping cycle of the switch 1950 and as soon as the wipers have again been advanced from the normal or home contact position, the off-normal contacts 1959A will again be closed and a circuit including the contacts 2013′, 2034, 2083 and 2136 will be completed for operating the relay R2120. Relay R2120 upon operating will, at its contacts 2121, complete a circuit including the contacts 2011′ for operating the relay R2130. This latter relay, however, will be short circuited as long as the off-normal contacts 1959A are closed. At the end of the second stepping cycle of the switch 1950 the off-normal contacts 1959A will again be open and, as a result thereof, the short circuit around the relay R2130 will be removed therefrom so that a circuit is now completed from the winding of the relay R2120, contacts 2121, relay R2130 and ground at the contacts 2011′ so that the relay R2130 will operate in series with the relay R2120. At its contacts 2133 the relay R2130 applies a controlled ground potential to the wiper 1952 of the switch 1950 and, at its contacts 2136, interrupts the initial energizing circuit for the relay R2120. The latter relay however will remain in its operated position in series with the relay R2130.

During the third stepping cycle of the switch 1950, the switch 1950 will be under the control of the wiper 1951, not shown, in a manner described in detail in the copending application referred to previously and the wipers 1951 to 1955, inclusive, will be advanced in a manner there described to the contact 19 of the associated contact bank. Further operation of the switch 1950 will be described hereinafter only insofar as it relates to its wiper 1952. As soon as the wipers leave the home contact position for the third stepping cycle the off-normal contacts 1959A are again closed but no circuit is now completed because the relay R2130 has been operated at the end of the second stepping cycle to open the previously described circuit at its contacts 2136 as above described. When the wiper 1952 reaches the contact 19 position ground potential at the contacts 2133 is extended to complete an operating circuit for the national test relay R1930. The operations which now follow will depend upon whether or not the call being handled by the Director is a national toll call or one designated as a short-haul toll call.

As soon as the relay R1930 operates, as noted above, it closes its contacts 1934 in order to lock itself in an operated position if a ground potential is encountered by the conductor 1201LHL extending to the digit register 1200. This conductor is grounded only in the event that a national toll code has been dialed by the calling subscriber. It will be assumed at this point that no such ground is encountered because no national toll code has been dialed. As a further result of the operation of the relay R1930 the conductor 701CR22, at the contacts 1932 and 1933, respectively, is disconnected from the contact 20 and connected to the contact 18 of the contact bank accessible to the wiper 1952. The wipers of the switch 1950, including the wiper 1952 are now advanced from the contacts 19 to the contacts 20 thus interrupting the circuit for the test relay R1930. This relay, since no locking circuit was completed, immediately restores to normal and thereby disconnects, at its contacts 1933, the conductor 701CR22 from the bank contact 18 accessible to the wiper 1952, and, at its contacts 1932, connects the conductor 701CR22 to the contact 20 accessible to the wiper 1952. This completes a circuit from ground at the contacts 2133 by way of the wiper 1952, engaged contact 20, contacts 1932, conductor 701CR22 extending to Fig. 2, and the winding of the Director release relay R680 to battery. Thus the Director will be released and the Director hunter 250 be advanced one position as previously described consequent to the operation of the release relay R680 after the last digit of a called subscriber number in a short-haul toll call has been transmitted to the toll ticketing equipment for storage.

In the event that a national toll call has been registered the operation of the call recorder 2000 is identical with that for a short-haul toll call and the various controls exercised by the code send switch 1950 in this connection during its several stepping cycles are also fully described in the copending application referred to. At this time the wiper 1952 will also engage the contact 19 and will also complete the operating circuit as previously described for the national test relay R1930, however, now a locking circuit for the relay R1930 will be completed over the contacts 1934 to the ground encountered on the conductor 1201LHL extending to the digit register 1200 to ground at the contacts 1226 of the relay R1220. This relay will always be operated when a national toll code has been dialed by the calling subscriber. As a further result of the operation of the relay R1930, at its contacts 1932, it disconnects the Direction release control conductor 701CR22 from the contact 20 accessible to the wiper 1952. Thus when the wiper 1952 is advanced from the contact 19 of the contact bank to contact 20 the latter contact will be ineffective to extend a ground potential by way of the conductor 701CR22 to the Director release relay R680. During the fourth rotational stepping cycle of code send switch 1950 in which the wiper 1955, not shown, is effective to transmit informational data in code form pertaining to a national toll call as previously mentioned to the toll ticketing equipment for storage, the wiper 1952 will be advanced to its 18th contact on the associated contact bank. Ground potential at the contacts 2133 will at this time be extended by way of contacts 1933 of the relay R1930 to the conductor 701CR22 which in turn extends the ground to the Director release relay R680 of the controller 400. Release of the Director and the advance of the Director hunter 250 will now be initiated as previously described after the required data for printing a toll ticket has been transmitted from the Director and stored in the toll ticketing equipment.

When the three digit special service code number is registered in the first three digit registers 1020, 1030 and 1040, the translator 2700 will be selected in the same manner as though these three digits identified a called office code and the necessary translation operation will be accomplished. However, in this case the relay R2701 of the translator 2700 will not be operated after determination that the call is one for which no recording is required. In this case the relay R2010 will not be operated as described for calls to be recorded, and therefore the conductor 701CR22 extending to the Director release relay R680 of Fig. 2 will remain connected to the contacts 2011 to the conductor 1601CR31 extending to the call sender 1400. The ground at the contacts 2133 of the call recorder will not now be effective to operate the relay R680. When the call sender equipment 1400 of the Director has transmitted all of the translated digits necessary to route the call to the called special service operator as more fully described in the aforesaid copending application, the grounded wiper 1403 of the send sequence switch 1420 in the sender 1400 will engage the associated bank contact 14 to thereby extend ground potential to the Director release relay R680 by way of the conductor 1441Y, contact 1661 of the incomplete detect relay R1660, conductor 1601CR31 extending to the call recorder 2000, contacts 2011, conductor 701CR22 extending to the controller 400 and the winding of the relay R680 to battery. The operation of relay 680 causes the release of the Director and the operation of the Director hunter as previously described.

In the above generalized description of the operation of the call recorder 2000 the operation, in the case of calls to be recorded, of the AB toll relay R2010 was briefly referred to. In addition to the operation of the contacts described above, operation of the relay R2010 also initiates operations whereby a detector is assigned to the call recorder 2000. The operation of the detector whereby the particular Director equipment and the numerical portion of the calling subscriber directory number are identified will not here be described in view of the fact that the detector equipment and its operation has been fully described in the previously referred to copending application of Coleman. However, special provision has been made in the detector equipment for signalling the call recorder 2000 whenever the detector has failed to complete the detection of the calling subscriber directory number. For the purpose of describing the present invention it is sufficient to state that upon the failure of the detector so to detect such a directory number a ground potential in the detector equipment 1900 will be applied to the conductor 1962INC extending to battery through the winding of the detector failure relay R2160 of the call recorder 2000. As soon as the relay R2160 is operated it immediately locks itself over a circuit including its contacts 2165 and ground potential at the contacts 2011′ of the operated relay R2010. At its contacts 2164 the relay R2160 will apply the ground potential from the contacts 642′ in the controller 400 on the conductor 605CR29 to the conductor 1207DR extending to the call sender 1400 of Fig. 3 to operate the incomplete detection relay R1660 in the call sender 1400. This relay is operated at this time to cause the Director to release whatever connection it has established through the primary selector 300 and subsequent switches in the switch train and to control the sender by means of routing digits that are preregistered in the Director to reestablish a new connection to an operator position.

The incomplete detection relay R1660, at its contacts 1661, interrupts a point in the circuit including the conductor 1601CR31 in order to prevent the release of the Director at this time, that is, when the wiper 1403 of the send sequence switch 1420 advances to the 14th contact position with the result as described hereinbefore.

The operation of the incomplete detection relay R1660 with the resultant operation of associated relays further functions to control the send sequence switch 1420 so that it will skip over any and all the contacts 1 to 20 in the associated contact banks without controlling the sender 1400 to send digits that have been registered on the code marking conductors on the corresponding bank contacts. As the wipers of the send sequence switch 1420 are advanced over the contacts 21 to 25, inclusive, the digits preregistered in the route registers, not shown, for routing the call to an operator position are transmitted and the route digits originally registered in the route registers, also not shown, for routing a call to the office represented by the dialed office code will be discarded. When all of the substituted routing digits have been transmitted by the sender 1400, the wipers, including the wiper 1403, of the send sequence switch 1420 will have advanced to the 25th contacts of the associated bank contacts. When this occurs the ground potential at the wiper 1403 will complete the circuit including the conductor 701CR22 for the Director release relay R680 as previously described with the consequent release of the Director.

To complete the description of the circumstances under which the present invention is brought into use the release of the Director and the advance of the Director hunter 250 upon the abandonment of the call by the calling subscriber will also be considered. When the calling subscriber loop circuit is broken at the hookswitch by the replaced handset, the line relay R450 of the controller 400 to which the loop circuit has been extended is restored. Restoration of the relay R450, at its contacts 452, opens the operating circuit for the hold relay R430 which in turn restores and, at its contacts 435, interrupts an operating circuit for the seizure relay R640. The relay R640 restores and, at its contacts 648, prepares a point in an operating circuit for the release relay R670. Whether at this point the relay R670 will operate to complete, at its contacts 673, an obvious operating circuit for the Director release relay R680 will depend upon a number of conditions. If the calling subscriber has begun dialing the office code digits and the numerical portion of the called subscriber directory number, the operation of the Director will have begun to register the dialed digits through the receive sequence switch 1010 in the digit registers 1020, 1030 and 1040. Should any of the above digit registers or the receive sequence switch 1010 be moved from its normal position responsive to the digits dialed by the calling subscriber a circuit for the release relay R670 will be completed to battery through the last digit register moved from its normal position. Thus, assuming that the sequence switch 1010 and the dial registers 1020 and 1030 have been operated, upon abandonment of the call by the calling subscriber, battery will be provided to complete the operating circuit for the release relay R670 through the motor magnet M1031, interrupter contacts 1032, the strapped contacts 1–10 of the contact bank associated with the wiper 1033, the wiper 1033, home contact of the wiper 1043 of the register 1040, conducotr 601CR21 extending to the controller 400 and the winding of the relay R670. When the register switch 1030 has restored to normal in a well-known manner, the operating circuit for the relay R670 will be transferred by way of the home contact of the wiper 1033 to the wiper 1023 of the register switch 1020. Battery through the motor magnet M1021 will now be extended to the relay R670 through the interrupter contacts 1022 and the strapped contacts 1–10 of the contact bank associated with the wiper 1023 and the home contacts of the wipers 1033 and 1043 in the same manner as described for the restoration of the register switch 1033 after which the operating circuit for the relay R670 will be transferred at the home contact of the wiper 1023 to the wiper 1013. The process will now be repeated for the sequence switch 1010, battery being supplied through the motor magnet M1011. When the switch 1010 has been restored the operating circuit for the relay R670 will be broken unless battery is still encountered at the home contact of the wiper 1013. This will be the case if the send sequence switch 1420 of the call sender 1400 has also been moved from its normal position, in which case, battery will be extended to the relay R670 through the motor magnet M1421, off normal contacts 1424, the conductor 1061CR21A extending to the call register 900, home contact and wiper 1013 of the switch 1010, home contact and wiper 1023 of the register 1020, home contact and wiper 1033 of the register 1030, home contact and wiper 1043 of the register 1040, conductor 601CR21 extending to the controller 400, and the relay R670.

A circuit for operating the relay R670 is also completed whenever the timer switch 490 has been advanced from its normal position with consequent operations not here important. This circuit may be traced from ground and the contacts 648, winding of the relay R670, off normal contacts ON498, contacts 414, contacts 492, the winding of the magnet M491 to battery. The magnet M491 is self-interruptedly operated to advance its wipers to their home contact positions whereupon the off normal contacts ON498 are opened to interrupt this operating circuit for the relay R670 and this operating circuit is transferred by the off normal contacts ON497 to the conductor 419CR20 extending to the digit registers 1110 through 1140 and 1310 through 1340, inclusive.

If the call has progressed to the point where dialed digits have been registered in the digit registers 1110 through 1140, inclusive, not shown, or if the connection is one to be established in the national toll system and the call has progressed to the registration of the dialed digits in the additional digit registers 1310 through 1340, also not shown, then ground will be successively extended from each of the motor magnets of these digit registers as these registers are successively restored to normal through the conductor 419CR20 and off normal contacts ON497 to the relay R670, in the same manner as described above for the digit registers 1020 through 1040, inclusive.

The release relay R670 will be operated and remain in its operated position until all of the register switches, the send sequence switch 1420 of the sender 1400, and the timer switch 490 of the controller 400 have restored to normal. The relay R670, at its contacts 673, as has been stated, will close an obvious circuit for the Director release relay R680, the operation of which will effect the release of the Director and the advance of the Director hunter 250 in the manner hereinbefore described.

What has been described is considered to be the preferred embodiment and application of this invention and it is to be understood that modification may be made in the organization and arrangement of the circuit elements without departing from the scope of the invention as defined in the appendant claims.

What is claimed is:

1. In a telephone system, a local exchange, a calling subscriber line and a called subscriber line in said local exchange, local switches in said local exchange for completing calls to called subscriber lines in said local exchange, called subscriber lines in other exchanges, a plurality of register senders in said local exchange, a step-by-step switch in said local exchange having access to said register senders, connecting means individual to said step-by-step switch operated to connect said calling subscriber line to the next idle one of said register senders in response to said calling subscriber line initiating a call, registering means in said connected register sender operated responsive to the subscriber on said calling line dialing the digits of the directory telephone number of any one of said called subscriber lines for registering the dialed digits of said called subscriber line, a motor magnet for operating said step-by-step switch, means in said connected register sender responsive as soon as sufficient digits are registered in said registering means to determine that said called subscriber line is in said local exchange for operating said motor magnet, means operated by said motor magnet for releasing said connecting means, said release of said connecting means disconnecting said calling subscriber line from said connected register sender and directly connecting said calling subscriber line to said local switches to enable the remaining digits dialed by said calling line to directly operate said local switches, and said release of said connecting means also restoring said motor magnet to always advance said step-by-step switch one step head to another register sender without regard to initiation of any subsequent calls by the same or any other calling subscriber thereby preventing the seizure of the same register sender, in case said register sender becomes idle prior to initiation of a second call and irrespective of said first call being released or not released.

2. In a toll ticketing telephone system, calling subscriber lines, called subscriber lines, a plurality of register senders and means for routing calls from said calling subscriber lines to said called subscriber lines, a step-by-step switch having access to said register senders, means for operating said switch responsive to one of said calling subscriber lines initiating a call for connecting said calling subscriber line to the next idle one of said register senders, a detector associated with said connected register sender to detect and identify said calling subscriber line, and means in said connected register sender operative in case said associated detector fails to detect and identify said calling subscriber line for always advancing said switch one step ahead to another register sender and to restore said connected register sender to common use by other calling lines said restored register sender reselectable for use only by said step-by-step switch advancing ahead in successive step-by-step operations.

3. In a toll ticketing telephone system, calling subscriber lines and called subscriber lines, a plurality of register senders each including means for registering the calling subscriber directory telephone number, a step-by-step switch having access to said register senders, means for operating said switch responsive to one of said calling subscriber lines initiating a call for connecting register senders, means for operating said registering said calling subscriber line to the next idle one of said means responsive to the subscriber on said calling line dialing the directory telephone number of one of said called subscriber lines for registering the directory telephone number of said calling subscriber line, storing means, means for transferring said registered directory telephone number from said registering means to said storing means, and means in said connected register sender operated in response to the completion of said transfer to said storing means for always advancing said switch one step ahead to the next register sender to thereby disconnect said calling line from said connected register sender and to release said connected register sender for use by other calling subscriber lines said released register sender reselectable for use only by said step-by-step switch advancing ahead in successive step-by-step operations.

4. In a toll ticketing telephone system, calling subscriber lines and called subscriber lines, a plurality of register senders each including means for registering the called subscriber directory telephone number, a step-by-step switch having access to said register senders, means for operating said switch responsive to one of said calling subscriber lines initiating a call for connecting said calling subscriber line to the next idle one of said register senders, means for operating said registering means responsive to the subscriber on said calling line dialing the directory telephone number of one of said called subscriber lines for registering the directory telephone number of said called subscriber line, storing means, means for transferring said registered directory telephone number from said registering means to said storing means, and means in said connected registered sender operated in response to the completion of said transfer to said storing means for always advancing said switch one step ahead to the next register sender to thereby disconnect said calling line from said connected register sender and to release said connected register sender for use by other calling subscriber lines said released register sender reselectable for use only by said step-by-step switch advancing ahead in successive step-by-step operations.

5. In a toll ticketing telephone system, calling subscriber lines and called subscriber lines, a plurality of register senders each including means for registering the calling and the called subscriber directory telephone numbers, a step-by-step switch having access to said register senders, means for operating said switch responsive to one of said calling subscriber lines initiating a call for connecting said calling subscriber line to the next idle one of said register senders, means for operating said registering means responsive to the subscriber on said calling line dialing the directory telephone number of one of said called subscriber lines for registering the directory telephone number of both said calling and called subscriber lines, storing means, means for transferring said registered directory telephone numbers from said registering means to said storing means, and means in said connected register sender operated in response to the completion of said transfer to said storing means for always advancing said switch one step ahead to the next register sender to thereby disconnect said calling subscriber line from said connected register sender and to release said connected register sender for use by other calling subscriber lines said released register sender reselectable for use only by said step-by-step switch advancing ahead in successive step-by-step operations.

6. In a telephone system, a local exchange, a calling subscriber line and a called subscriber line terminating in said local exchange, other exchanges, other called subscriber lines terminating in said other exchanges, a plurality of register senders in said local exchange, a step-by-step switch in said local exchange having access to said register senders, means for operating said switch responsive to said calling subscriber line intiating a call for connecting said calling subscriber line to the next idle one of said register senders, registering means in said connected register sender operated responsive to the subscriber on said calling line dialing the digits of the directory telephone number of any one of said called subscriber lines for registering the digits of the said one called subscriber line, and means in said connected register sender responsive as soon as sufficient digits are registered to determine that the said one called subscriber line is in said local exchange for always advancing said switch one step ahead to the next register sender and for restoring said connected register sender to common use by other calling subscriber lines said restored register sender reselectable for use only by said step-by-step switch advancing ahead in successive step-by-step operations.

7. In a toll ticketing telephone system, a calling subscriber line, called subscriber lines, a plurality of register senders each including means for registering the calling subscriber directory telephone number, a step-by-step switch having access to said register senders, means for operating said switch responsive to said calling subscriber line initiating a call for connecting said calling subscriber line to the next idle one of said register senders, means for operating said registering means of said connected register sender responsive to the subscriber on said calling line dialing the directory telephone number of a called subscriber line for registering the directory telephone number of said calling subscriber line, a ticketer having storing means, means for transferring said registered telephone number to said storing means in said ticketer, and means in said connected register sender operated after completion of said transfer for initiating the release of said register sender and for simultaneously therewith always advancing said switch one step ahead to the next register sender to disconnect said calling subscribed line from said connected register sender before said connected register sender is fully restored said restored register sender reselectable for use only by said step-by-step switch advancing ahead in successive step-by-step operations.

8. In a toll ticketing telephone system, a calling subscriber line, called subscriber lines, a plurality of register senders including means for routing calls from said calling subscriber line to said called subscriber lines, a step-by-step switch having access to said register senders, means for operating said switch responsive to said calling subscriber line initiating a call for connecting said calling subscriber line to the next idle one of said register senders, a detector, means for connecting said detector to said idle one of said register senders, means in said detector responsive after said connection for identifying said calling subscriber line, means in said connected register sender operated responsive to the failure of said detector to identify said calling subscriber line for always advancing said switch one step to the next register sender and to restore said connected register sender to common use by other calling subscriber lines said restored register sender reselectable for use only by said step-by-step switch advancing ahead in successive step-by-step operations.

9. In a telephone system, a calling line, a trunk line accessible to said calling line, called lines, means including a register sender for routing connections between said trunk line and one of said called lines responsive to digits dialed on said calling line, means associated with said register sender for identifying said calling line, switching means including a first selector for extending said trunk line to called lines responsive to said routing operation of said register sender, a stepping switch having access to said register sender, said stepping switch connecting said register sender to said first selector and said trunk line, a motor magnet for stepping said switch, a first circuit for operating said magnet, relay means for controlling the energization of said first circuit, and a second circuit for operating said relay means, said second circuit energized in case of the failure of said identifying means to identify said calling line, said second circuit energized responsive to the completion of said routing operation of said register sender in case said identifying means identifies said calling line, said first circuit energized responsive to the operation of said relay means to operate said motor magnet to always step said switch ahead to thereby disconnect said register sender from said first selector and said trunk line and advance said switch to the next register sender said disconnected register sender reselectable for use only by said step-by-step switch advancing ahead in successive step-by-step operations.

10. In a telephone system, calling lines, a local exchange, called lines in said local exchange, other exchanges, called lines in said other exchanges, a trunk line accessible to said calling lines, switching means for extending said trunk line to called lines, a register sender in said local exchange, a stepping switch in said local exchange having bank contacts associated therewith and having access to said register sender through one of said bank contacts, means responsive to the initiation of a call on one of said calling lines for operating said switch to connect said register sender to said switching means and to said trunk line, registering means in said register sender operated responsive to the dialing of the office code digits of the telephone directory number of said called lines in said local exchange and said called lines in said other exchanges for registering the office code digits of said called lines, means in said registering means for distinguishing between called lines in said local exchange and called lines in said other exchanges from said dialed office code digits, a stepping magnet for stepping said switch, a first energizing circuit means for operating said magnet, relay means for controlling said first energizing circuit means, and a second energizing circuit means for operating said relay means, said second circuit means energized by said distinguishing means in response to said registering means registering the last digit of the office code of a called line in said local exchange to operate said relay means, said first energizing circuit means operated responsive to the operation of said relay means to operate said stepping magnet to always thereby step said switch ahead from the said one of said bank contacts to the next bank contacts whereby said register sender is disconnected from said switching means and said trunk line and said switch is advanced to the next register sender said disconnected register sender reselectable for use only by said step-by-step switch advancing ahead in successive step-by-step operations.

11. In a telephone system as claimed in claim 10, means in said register sender for controlling said switching means responsive to the completion of the registration of said dialed digits of the telephone directory number of a called line in said other exchanges to extend said trunk to said called line in said other exchanges, said second energizing circuit means energized after the said completion of said registration of said dialed digits of the telephone directory number of said called line in said other exchanges to operate said relay means to operate said stepping magnet to always thereby step said switch from the said one of said bank contacts to the next bank contacts whereby said register sender is disconnected from said switching means and said trunk line said switch is advanced to the next register sender said disconnected register sender reselectable for use only by said step-by-step switch advancing ahead in successive step-by-step operations.

12. In a toll ticketing telephone system, a first, second and third exchange, a calling line in said first exchange, called lines in said exchanges, switching apparatus including a first selector and a trunk line, a register sender normally controllable responsive to digits of the telephone directory number of a called line dialed on said calling line by a calling subscriber for operating said switching apparatus to set up a connection including said first selector and said trunk line from said calling line to said called line in any one of said exchanges, means associated with said register sender for identifying said calling line, other means in said register sender operated responsive to the dialing of certain of the digits of said telephone directory number for identifying a connection to be set up to a called line in said first exchange, a stepping switch having bank contacts associated therewith and having access to said register sender through one of said bank contacts, said stepping switch operated responsive to the initiation of a call on said calling line to connect said register sender to said switching apparatus, a motor magnet for operating said stepping switch, a first circuit means including a relay for operating said magnet means, a second circuit means, means for energizing said second circuit means responsive to said other means in said register sender identifying a connection to be set up to a called line in said first exchange, and means for energizing said second circuit means operated after the completion of said setting up of a connection to a called line in said second and third exchanges, said relay operated responsive to the energizing of said second circuit means to control said first circuit means to operate said magnet means to thereby always step said switch ahead from the said one of said bank contacts whereby said register sender is disconnected from said switching apparatus and said switch is advanced to the next bank contacts and the next register sender said disconnected register sender reselectable for use only by said step-by-step switch advancing ahead in successive step-by-step operations.

13. In a toll ticketing telephone system as claimed in claim 12, means for energizing said second circuit means responsive to the failure of said identifying means in said register sender to identify said calling line.

14. In a telephone system, a calling line, a first and a second exchange, switching apparatus including a first switch and a trunk circuit, a register sender normally controllable for operating said switching apparatus to set up connections including said first switch and said trunk circuit, said register sender controllable responsive to the digits of the telephone directory number of called lines in said first and second exchanges dialed on said calling line to set up a connection between said calling line and called lines in said exchanges, and said register sender controllable responsive to a predetermined group of office code digits of the digits of said telephone directory number of called lines dialed on said calling line to connect said calling line to said switching apparatus so that said switching apparatus is operated directly by the remaining digits of said telephone directory number dialed on said calling line, a second switch having bank contacts associated therewith and having access to said register sender, said second switch connecting said register sender to said switching apparatus through one of said bank contacts responsive to the initiation of a call on said calling line, operating means for said second switch, a release relay, a first operating circuit for said release relay energized responsive to the completion of the setting up of said connections by said register sender responsive to said dialed digits of said telephone directory numbers of said called lines in said first and second exchanges, and a second operating circuit for said release relay energized responsive to the operation of said register sender responsive to the dialing on said calling line of the said predetermined group of office code digits, said operating means operated responsive to the operation of said release relay to operate said second switch from the said one of said bank contacts to disconnect said register sender from said switching apparatus and advance said second switch to the next register sender said disconnected register sender reselectable for use only by said step-by-step switch advancing ahead in successive step-by-step operations.

15. In a telephone system as claimed in claim 14, a third operating circuit for said release relay energized responsive to the abandonment of a call on said calling line before said register sender has completed operation responsive to controlling digits dialed on said calling line.

References Cited in the file of this patent

UNITED STATES PATENTS

| | | |
|---|---|---|
| 2,628,282 | Ostline | Feb. 10, 1953 |
| 2,680,155 | Molnar | June 1, 1954 |
| 2,711,444 | Oberman | June 21, 1955 |
| 2,721,901 | Stehlik | Oct. 25, 1955 |